(12) United States Patent
Hu et al.

(10) Patent No.: US 11,115,618 B2
(45) Date of Patent: Sep. 7, 2021

(54) TELEVISION POWER SUPPLY DRIVING DEVICE AND TELEVISION

(71) Applicant: SHENZHEN SKYWORTH-RGB ELECTRONIC CO., LTD., Shenzhen (CN)

(72) Inventors: Xiangfeng Hu, Shenzhen (CN); Xiaojie Bao, Shenzhen (CN); Sikuan Shen, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 16/961,208

(22) PCT Filed: Jun. 28, 2019

(86) PCT No.: PCT/CN2019/093521
§ 371 (c)(1),
(2) Date: Jul. 9, 2020

(87) PCT Pub. No.: WO2020/133991
PCT Pub. Date: Jul. 2, 2020

(65) Prior Publication Data
US 2020/0344438 A1 Oct. 29, 2020

(30) Foreign Application Priority Data
Dec. 25, 2018 (CN) .......................... 201811593142.8

(51) Int. Cl.
*H04N 5/63* (2006.01)
*H04N 5/44* (2011.01)
(52) U.S. Cl.
CPC ................. *H04N 5/63* (2013.01); *H04N 5/44* (2013.01)

(58) Field of Classification Search
CPC .......... H04N 5/63; H04N 5/44; H04N 5/4401; H04N 5/4411; G02F 1/133602
USPC .................................................. 348/730, 725
See application file for complete search history.

(56) References Cited

U.S. PATENT DOCUMENTS 7,532,494 B2 * 5/2009 Louvel ..................... H04N 5/63
363/89
7,558,977 B2 * 7/2009 Kim ......................... H04N 5/63
348/14.04
(Continued)

FOREIGN PATENT DOCUMENTS

CN 204442810 U 7/2015
CN 104935843 A 9/2015
(Continued)

OTHER PUBLICATIONS

World Intellectual Property Organization (WIPO) International Search Report for PCT/CN2019/093521 dated Sep. 6, 2019, 5 Pages.

*Primary Examiner* — Trang U Tran
(74) *Attorney, Agent, or Firm* — Anova Law Group, PLLC

(57) ABSTRACT

The present disclosure discloses television power driving device and television, standby control module controls power supply module to turn on resonance control module and PFC circuit successively when receiving power-on signal, PFC circuit outputs PFC voltage to first and second LLC resonance modules, first LLC resonance module converts PFC voltage into first voltage and second voltage according to first control signal, outputs respectively to mainboard and secondary LLC control module for power, after being rectified and filtered by rectifying filter module. Second LLC resonance module converts PFC voltage to third voltage according to second control signal, outputs to backlight module for power after synchronous rectified by synchronous rectifier module; standby control module con- (Continued)

trols power supply module to shut down PFC circuit to stop outputting PFC voltage, when receiving standby signal, making resonance control module enter standby state, simplifying power supply architecture and avoiding limiting power efficiency or heat dissipation.

15 Claims, 3 Drawing Sheets

(56) References Cited

U.S. PATENT DOCUMENTS

| | | | |
|---|---|---|---|
| 9,985,474 B2* | 5/2018 | Lee | H02J 9/065 |
| 10,332,474 B2* | 6/2019 | Joo | G09G 3/3406 |
| 10,341,602 B2* | 7/2019 | Yu | G02F 1/133602 |
| 10,397,991 B2* | 8/2019 | Newman, Jr. | H05B 45/44 |
| 10,461,654 B2* | 10/2019 | Wu | G06F 1/28 |
| 10,536,998 B2* | 1/2020 | Wang | H02M 3/337 |
| 10,694,138 B2* | 6/2020 | Cai | H02M 3/33592 |
| 2008/0297462 A1* | 12/2008 | Hsiung | G09G 3/3406 |
| | | | 345/102 |
| 2016/0036271 A1 | 2/2016 | Lee et al. | |
| 2017/0099011 A1 | 4/2017 | Freeman et al. | |

FOREIGN PATENT DOCUMENTS

| | | |
|---|---|---|
| CN | 105099202 A | 11/2015 |
| CN | 105323512 A | 2/2016 |
| CN | 106409220 A | 2/2017 |
| CN | 107197185 A | 9/2017 |
| CN | 109547721 A | 3/2019 |

* cited by examiner

TELEVISION POWER SUPPLY DRIVING DEVICE AND TELEVISION

CROSS-REFERENCES TO RELATED APPLICATIONS

This application is a national stage application of PCT Patent Application No. PCT/CN2019/093521, filed on 28 Jun. 2019, which claims priority to Chinese Patent Application No. 201811593142.8, filed on 25 Dec. 2018, the content of all of which is incorporated herein by reference.

FIELD OF THE INVENTION

The present discloser relates to the field of electrical power supply, and more particularly, to a television power supply driving device and a television.

BACKGROUND

A traditional large-size LED TV (Light Emitting Diode Television) power supply system usually comprises: an EMI circuit (Electromagnetic Interference circuit), a PFC circuit (a Power Factor Correction circuit), a high-current output LLC resonance circuit for powering a backlight module together with a separate synchronous rectifier circuit, and a LLC resonance circuit for powering a mainboard, and a separate standby circuit. However, in an existing power supply system, since there contains an independent standby circuit, the system is made pretty complicated, having a plurality of devices, and a higher cost, occupying a larger PCB (Printed Circuit Board) area, which is not conducive to a miniaturization for a large-size power supply or a low cost. Currently, there are some power supplies using a flyback circuit to power the mainboard, to eliminate the standby circuit, however, using the flyback circuit makes the power supply less efficient and a heat sink larger, which is not conducive to a heat dissipation of the power supply of a high-power TV.

Therefore, the current technology needs to be improved and developed.

BRIEF SUMMARY OF THE DISCLOSURE

According to the above described defects, the purpose of the present disclosure is providing a television power supply driving device and a television, by both a main power supply and an auxiliary power supply adopting an LLC architecture and eliminating a separate standby circuit, it is achieved that the power supply architecture is simplified, while avoiding a problem of limiting a power efficiency and a heat dissipation.

A technical solution of the present invention to solve the technical problems is as follows:

a television power supply driving device, comprising a power board connected to a mainboard and a backlight module, the power board has a PFC circuit arranged, wherein the power board has further arranged an auxiliary power supply for supplying power to the mainboard, and a main power supply for supplying the backlight module; the auxiliary power supply comprises a first LLC resonance module, a resonance control module, a standby control module, a power supply module, and a rectifying filter module; the main power supply comprises a second LLC resonance module, a secondary LLC control module, and a synchronous rectifier module;

after powered on, when receiving a power-on signal, the standby control module controls the power supply module to turn on the resonance control module and the PFC circuit successively, the PFC circuit outputs a PFC voltage to the first LLC resonance module and the second LLC resonance module, the first LLC resonance module converts the PFC voltage into a first voltage and a second voltage according to a first control signal output from the resonance control module, the first voltage and the second voltage are then output to the mainboard and the secondary LLC control module for power respectively, after being rectified and filtered by the rectifying filter module; the second LLC resonance module converts the PFC voltage into a third voltage according to a second control signal output by the secondary LLC control module, and outputs the third voltage to the backlight module for power after being synchronous rectified by the synchronous rectifier module; the standby control module controls the power supply module to shut down the PFC circuit to stop outputting the PFC voltage, when receiving a standby signal, making the resonance control module enter a standby state.

The television power supply driving device, wherein the main power supply further comprises a driving isolation module, the driving isolation module isolates and outputs the second control signal output from the secondary LLC control module to the second LLC resonance module.

The television power supply driving device, wherein the main power supply further comprises a current detection module, the current detection module detects a current of the second LLC resonance module before outputting a current feedback signal to the secondary LLC control module, the secondary LLC control module adjusts the second control signal according to the current feedback signal.

The television power supply driving device, wherein the resonance control module comprises a pre-start unit, a resonance control unit, and a feedback unit; after powered on, the pre-start unit provides a pre-start voltage to the resonance control unit, and after being turned on, the resonance control unit outputs the first control signal to the first LLC resonance module; the feedback unit performs a voltage detection on the first voltage and the second voltage, and outputs a voltage feedback signal to the resonance control unit, the resonance control unit adjusts the first control signal based on the voltage feedback signal.

The television power supply driving device, wherein the standby control module comprises a signal detection unit and an output control unit; the signal detection unit outputs a first level to the output control unit when the power-on signal is detected, and outputs a second level to the output control unit when the standby signal is detected; the output control unit controls the power supply module to turn on the resonance control module and the PFC circuit successively when receiving the first level, and controls the power supply module to turn off the PFC circuit when receiving the second level.

The television power supply driving device, wherein the pre-start unit comprises a first diode and a first resistor, the resonance control unit comprises a first resonance controller; an anode of the first diode connects to an output terminal of an EMI filter circuit, a cathode of the first diode connects to an HV signal terminal of the first resonance controller through the first resistor; an HO signal terminal, an LO signal terminal, and an HB signal terminal of the first resonance controller connect to the first LLC resonance module, an FB signal terminal of the first resonance controller connects to the feedback unit, a VCC terminal of the first resonance controller connects to the power supply module; the feedback unit further connects to an output terminal of the rectifying filter module.

The television power supply driving device, wherein the signal detection unit comprises a second resistor, a third resistor, a first capacitor, and a triode; the output control unit comprises an optocoupler, one end of the second resistor connects to an on/standby signal input terminal, another end of the second resistor connects to one end of the third resistor, one end of the first capacitor, and a base of the triode; another end of the third resistor, another end of the first capacitor, and an emitter of the triode are all grounded; a collector of the triode connects to a second terminal of the optocoupler; a first terminal of the optocoupler connects to a second voltage output terminal; a third terminal and a fourth terminal of the optocoupler are both connected to the power supply module.

The television power supply driving device, wherein the first LLC resonance module comprises a fourth resistor, a fifth resistor, a first MOS transistor, a second MOS transistor, a second capacitor, a third capacitor, a second diode, and a first transformer, the rectifying filter module comprises a first rectifying filter unit and a second rectifying filter unit; one end of the fourth resistor connects to the HO signal terminal of the first resonance controller, another end of the fourth resistor connects to a gate of the first MOS transistor; one end of the fifth resistor connects to the LO signal terminal of the first resonance controller, another end of the fifth resistor connects to a gate of the second MOS transistor; a drain of the first MOS transistor connects to an output terminal of the PFC circuit, a source of the first MOS transistor connects to a drain of the second MOS transistor, the HB signal terminal of the first resonance controller and a first terminal of the first transformer; a source of the second MOS transistor gets grounded; one end of the second capacitor connects to a second terminal of the first transformer, another end of the second capacitor gets grounded; an anode of the second diode connects to a third terminal of the first transformer, a cathode of the second diode connects to an anode of the third capacitor and the power supply module; a tenth terminal and a twelfth terminal of the first transformer connect to a first voltage output terminal through the first rectifying filter unit, a sixth terminal and a ninth terminal of the first transformer connect to the second voltage output terminal through the second rectifying filter unit.

The television power supply driving device, wherein the secondary LLC control module comprises a second resonance controller and a switch, the driving isolation module comprises a driving transformer, a sixth resistor, and a fourth capacitor; one end of the sixth resistor connects to a PLH signal terminal of the second resonance controller, another end of the sixth resistor connects to a sixth terminal of the driving transformer; one end of the fourth capacitor connects to a PLL signal terminal of the second resonance controller, another end of the fourth capacitor connects to a seventh terminal of the driving transformer; a first terminal, a second terminal, and a fifth terminal of the driving transformer are all connected to the second LLC resonance module; a power terminal of the second resonance controller connects to the on/standby signal input terminal and a second voltage output terminal through the switch, a BCS signal terminal and a BICS signal terminal of the second resonance controller are both connected to the current detection module, an SLH signal terminal and an SLL signal terminal of the second resonance controller are both connected to the synchronous rectifier module.

The television power supply driving device, wherein the second LLC resonance module comprises a seventh resistor, an eighth resistor, a third MOS transistor, a fourth MOS transistor, a fifth capacitor, a second transformer, and a current transformer; one end of the seventh resistor connects to the first terminal of the driving transformer, another end of the seventh resistor connects to a gate of the third MOS transistor; one end of the eighth resistor connects to the fifth terminal of the driving transformer, another end of the eighth resistor connects to a gate of the fourth MOS transistor; a drain of the third MOS transistor connects to an output terminal of the PFC circuit; a source of the third MOS transistor connects to a drain of the fourth MOS transistor, the second terminal of the driving transformer, and a first terminal of the second transformer; a source of the fourth MOS transistor gets grounded; a fourth terminal of the second transformer connects to a third terminal and a fourth terminal of the current transformer, a fifth terminal and a sixth terminal of the second transformer are connected to a drain of a sixth MOS transistor M6; a seventh terminal and an eighth terminal of the second transformer are connected to a drain of a fifth MOS transistor; a ninth terminal, a tenth terminal, an eleventh terminal, and a twelfth terminal of the second transformer are all connected to a third voltage output terminal; one end of the fifth capacitor connects to a first terminal and a second terminal of the current transformer, another end of the fifth capacitor gets grounded; a seventh terminal of the current transformer connects to the current detection module.

The television power supply driving device, wherein the current detection module comprises a ninth resistor, a tenth resistor, an eleventh resistor, and a sixth capacitor; one end of the ninth resistor and one end of the sixth capacitor are both connected to the seventh terminal of the current transformer and one end of the tenth resistor, another end of the ninth resistor connects to the BICS signal terminal of the second resonance controller; another end of the tenth resistor connects to the BSC signal terminal of the second resonance controller and one end of the eleventh resistor, another end of the sixth capacitor and another end of the eleventh resistor are both grounded.

The television power supply driving device, wherein the synchronous rectifier module comprises the fifth MOS transistor and the sixth MOS transistor, a gate of the fifth MOS transistor connects to the SLH signal terminal of the second resonance controller, the drain of the fifth MOS transistor connects to the seventh terminal and the eighth terminal of the second transformer, a gate of the sixth MOS transistor connects to the SLL signal terminal of the second resonance controller, the drain of the sixth MOS transistor connects to the fifth terminal and the sixth terminal of the second transformer, a source of the fifth MOS transistor and a source of the sixth MOS transistor are both grounded.

The television power supply driving device, wherein the main power supply further comprises a seventh capacitor, an anode of the seventh capacitor connects to the third voltage output terminal, the ninth terminal, the tenth terminal, the eleventh terminal, and the twelfth terminal of the second transformer, and a cathode of the seventh capacitor is grounded.

The television power supply driving device, wherein a model of the first resonance controller is FA6A31N.

A television, wherein comprises the television power supply driving device described above.

Comparing to the current technology, the television power driving device and the television provided by the present disclosure, wherein the television power driving device comprises a power board connected to a mainboard and a backlight module. The power board has a PFC circuit arranged, and the power board has further an auxiliary power supply for powering the mainboard, and a main power supply for powering the backlight module; the auxiliary power supply comprises a first LLC resonance module, a resonance control module, a standby control module, a power supply module, and a rectifying filter module; the main power supply comprises a second LLC resonance module, a secondary LLC control module and a synchronous rectifier module. After powered on, the standby control module controls the power supply module to turn on the resonance control module and the PFC circuit successively when receiving a power-on signal, and the PFC circuit outputs the PFC voltage to the first LLC resonance module and the second LLC resonance module, the first LLC resonance module converts the PFC voltage into a first voltage and a second voltage according to a first control signal output from the resonance control module, before outputting the first voltage and the second voltage respectively to the mainboard and the secondary LLC control module for power, after being rectified and filtered by the rectifying filter module. The second LLC resonance module converts the PFC voltage to a third voltage according to a second control signal output by the secondary LLC control module, and outputs the third voltage to the backlight module for power after the synchronous rectifier module performing a synchronous rectification; the standby control module controls the power supply module to shut down the PFC circuit to stop outputting the PFC voltage when receiving the standby signal, making the resonance control module enter a standby state. By both the main power supply and the auxiliary power supply adopting an LLC architecture and eliminating a separate standby circuit, it is achieved that the power supply architecture is simplified, while avoiding a problem of limiting a power efficiency and a heat dissipation.

DETAILED DESCRIPTION OF EMBODIMENTS

According to a plurality of defects in the prior art, the present disclosure provides a television power supply driving device and a television, by both a main power supply and an auxiliary power supply adopting an LLC architecture and eliminating a separate standby circuit, it is achieved that the power supply architecture is simplified, while avoiding a problem of limiting a power efficiency and a heat dissipation.

In order to make the purpose, technical solution and the advantages of the present disclosure clearer and more explicit, further detailed descriptions of the present disclosure are stated herein, referencing to the attached drawings and some preferred embodiments of the present disclosure. It should be understood that the detailed embodiments of the disclosure described here are used to explain the present invention only, instead of limiting the present disclosure Embodiment 1

Figure 1:
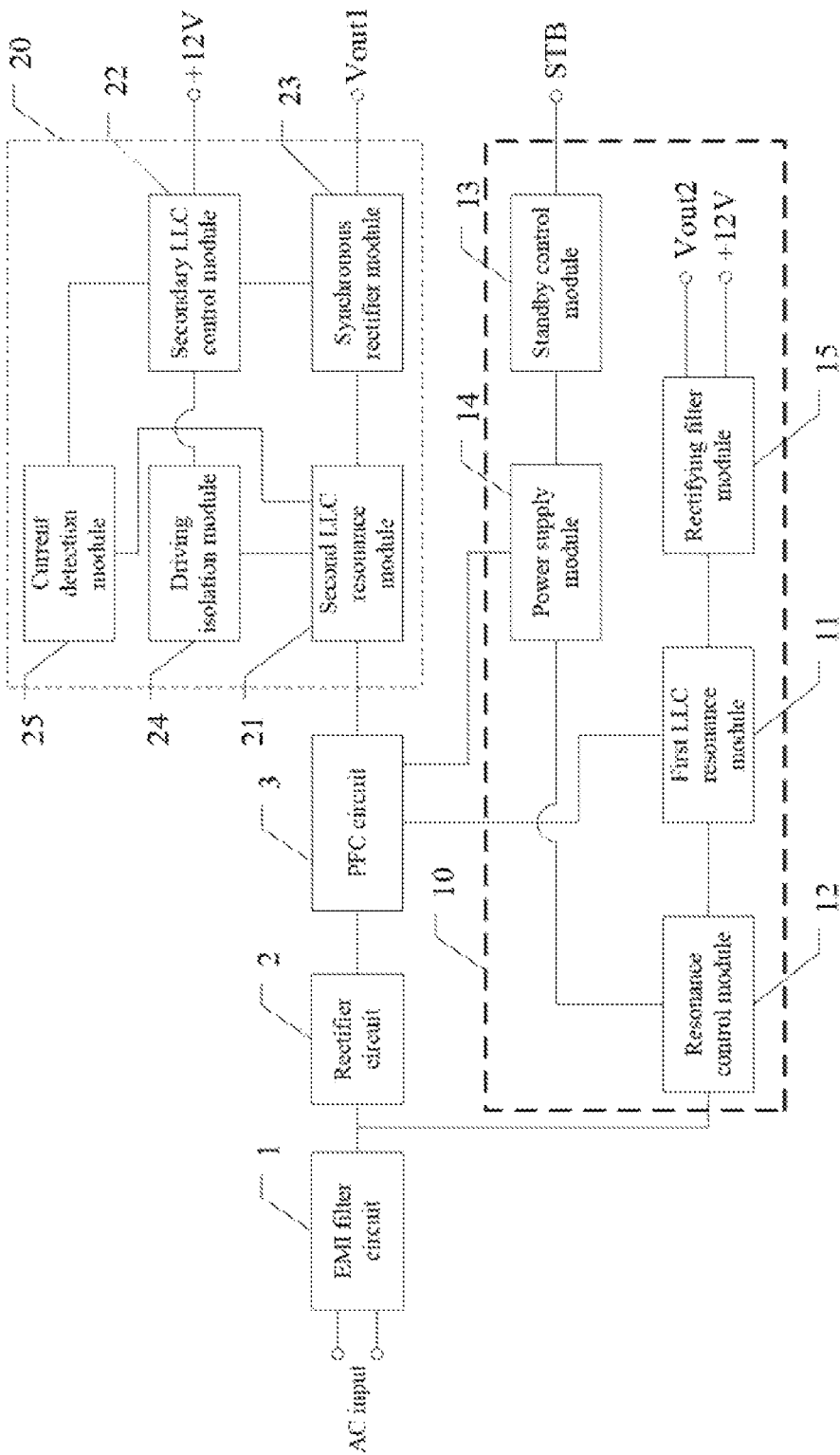
FIG. 1 illustrates a structural block diagram of a television power driving device provided by the present disclosure.

Referencing to FIG. 1, a television power supply driving device provided in the present disclosure, comprises a power board connected to a mainboard and a backlight module, the power board has an EMI filter circuit 1, a rectifier circuit 2 and a PFC circuit 3 arranged, as well as an auxiliary power supply 10, powering the mainboard, and a main power supply 20, powering the backlight module, wherein the auxiliary power supply further powers a logic board; the auxiliary power supply 10 comprises a first LLC resonance module 11, a resonance control module 12, a standby control module 13, a power supply module 14, and a rectifying filter module 15; the main power supply 20 comprises a second LLC resonance module 21, a secondary LLC control module 22, and a synchronous rectifier module 23. The EMI filter circuit 1, the rectifier circuit 2 and the PFC circuit 3 are connecting successively, the EMI filter module further connects to the resonance control module 12, while the resonance control module 12, the first LLC resonance module 11 and the rectifying filter module 15 are connecting successively, the PFC circuit 3 connects to the first LLC resonance module 11 and the second LLC resonance module 21, the power supply module 14 connects to the standby control module 13, the PFC circuit 3 and the resonance control module 12, the secondary LLC control module 22 connects to the rectifying filter module 15 (through +12V in the present embodiment), the synchronous rectifier module 23 and the second LLC resonance module 21, while the second LLC resonance module 21 connects to the synchronous rectifier module 23.

When turning on the device, after powered on, when receiving a power-on signal, the standby control module 13 controls the power supply module 14 to turn on the resonance control module 12 and the PFC circuit 3 successively, an input AC is filtered and rectified by the EMI filter circuit 1 and the rectifier circuit 2 successively, before outputting a PFC voltage to the first LLC resonance module 11 and the second LLC resonance module 21 through the PFC circuit 3. It is noted that, the EMI filter circuit 1, the rectifier circuit 2, and the PFC circuit 3 are all a current technology, they may all be accomplished by a plurality of currently mature circuits, thus no details are given for the structure and the connection thereof. The resonance control module 12 will output a first control signal to the first LLC resonance module 11 after starting to work, the first LLC resonance module 11 converts the PFC voltage into a first voltage (which is Vout2 in the present embodiment) and a second voltage (+12V in the present embodiment) according to the first control signal output from the resonance control module 11, before outputting the first voltage and the second voltage to the mainboard and the secondary LLC control module 22 for power respectively after being rectified and filtered by the rectifying filter module 15. That is, when powering on, after both the resonance control module 12 and the PFC circuit 3 start to work normally, the first LLC resonance module 11 performs a voltage transform according to the first control signal, converting the PFC voltage into the first voltage Vout2 before outputting to a mainboard, converting the PFC voltage into a second voltage +12V and outputting to the secondary LLC control module 22, to turn on the secondary LLC control module 22, and make the secondary LLC control module 22 output a second control signal to the second LLC resonance module 21, and the second LLC resonance module 21 then converts the PFC voltage into a third voltage (which is Vout1 in the present embodiment) according to the second control signal, before outputting the third voltage to the backlight module for power after being synchronous rectified by the synchronous rectifier module 23; so as finishing a process of powering on and turning on. Since both the main power supply 20 and the auxiliary power supply 10 are adopting a LLC structure, voltage efficiency is improved effectively, and no problems including a flyback circuit heat dissipation and a limited efficiency will be generated. A power supply output cross adjustment rate will be better, and an application will be more flexible.

When it is standby, the standby control module 13 controls the power supply module 14 to shut down the PFC circuit 3 to stop outputting the PFC voltage when receiving a standby signal, making the resonance control module 12 enter a standby state. That is, when receiving the standby signal, the standby control module 13 controls the power supply module 14 to stop powering the PFC circuit 3, and power the resonance control module 12 only, now the PFC circuit 3 stops outputting the PFC voltage, the first LLC resonance module 11 stops outputting the second voltage to the secondary LLC control module 22, making the secondary LLC control module 22 stop working, further making the second LLC resonance module 21 stop outputting the third voltage to the backlight module, and a screen is turned off, the resonance control module 12 enters a standby state, waiting for receiving a power-on signal before turning on the PFC circuit 3 again, making a whole system enter a turn-on state thus turning on the screen. Thus, the television power supply driving device provided by the present disclosure, through adopting an LLC oscillation architecture in the auxiliary power supply 10, achieves meeting a power supply requirement of the mainboard, and being able to act as a standby power supply, thus eliminating a separate standby circuit, and meeting a need of low standby power consumption, while simplifying an architecture of a high-power power supply, saving a system cost.

Further, the main power supply 20 further comprises a driving isolation module 24, the driving isolation module 24 connects to the secondary LLC control module 22 and the second LLC resonance module 21, the driving isolation module 24 isolates and outputs the second control signal output from the secondary LLC control module 22 to the second LLC resonance module 21. In the present embodiment, in the main power supply 20, a high power LLC control is arranged in a secondary output of the second LLC resonance module 21, by a method of the driving isolation module 24 isolating and driving, the second control signal is output to the second LLC resonance module 21, before driving the second LLC resonance module 21 to work. That has effectively lowered a risk of a primary damage to a controller, and improved a reliability of the power supply in a whole.

Furthermore, the main power supply 20 further comprises a current detection module 25. The current detection module 25 connects to the secondary LLC control module 22 and the second LLC resonance module 21, the current detection module 25 detects a current of the second LLC resonance module 21, before outputting a current feedback signal to the secondary LLC control module 22, the secondary LLC control module 22 adjusts the second control signal according to the current feedback signal. In the present embodiment, a current of a resonance network in the main power supply 20 is detected by the current detection module 25 and fed back to the secondary LLC control module 22, making the secondary LLC control module 22 be able to adjust the second control signal according to the current feedback signal, achieving an output power control and protection for an LLC resonance loop.

Embodiment 2

Figure 2:
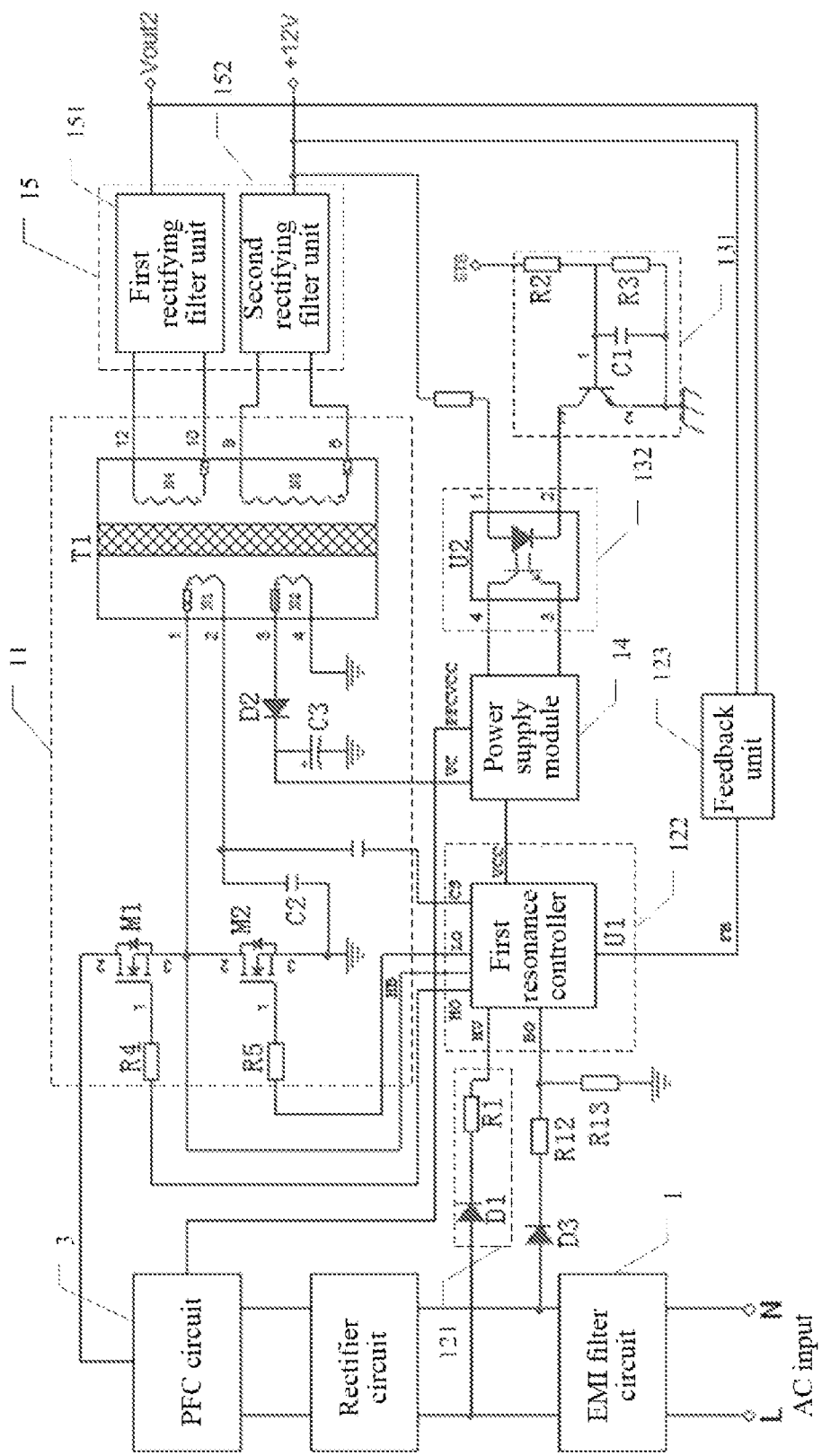
FIG. 2 illustrates a circuit diagram of an auxiliary power supply in a television power driving device provided by the present disclosure.

Specifically, referencing to the FIG. 2 together, the resonance control module 12 comprises a pre-start unit 121, a resonance control unit 122, and a feedback unit 123. The pre-start unit 121 connects to the EMI filter circuit 1 and the resonance control unit 122, the resonance control unit 122 connects to the power supply module 14 and the feedback unit 123, the feedback unit 123 further connects to a first voltage output terminal and a second voltage output terminal; wherein after powered on, the pre-start unit 121 provides a pre-start voltage for the resonance control unit 122, the resonance control unit 122 outputs the first control signal to the first LLC resonance module 11 after being started; the feedback unit 123 performs a voltage detection to the first voltage and the second voltage before outputting a voltage feedback signal to the resonance control unit 122, the resonance control unit 122 adjusts the first control signal according to the voltage feedback signal, wherein the feedback unit 123 may adopt a voltage detection and feedback circuit in the current technology, and the present disclosure makes no limitation herein. In the present embodiment, after powered on, the input AC is filtered by the the EMI filter circuit 1 before providing the pre-start unit 121 to the resonance control unit 122, to realize a start of the resonance control unit 122, then provides the resonance control unit 122 a DC low voltage power supply through the power supply module 14 when the standby control module 13 receives a power-on signal. The resonance control unit 122 outputs the first control signal to the first LLC resonance module 11 after starting and working properly, to control the first LLC resonance module 11 perform a voltage transform. In order to ensure a stability of an output voltage, a voltage detection and feedback is performed through the feedback unit 123, making the resonance control unit 122 be able to adjust the first control signal based on a voltage detection result, realizing a closed loop control for the LLC resonance loop, maintaining a stability of the output voltage, and improving a work stability and a work reliability of the power supply.

Further, the standby control module 13 comprises a signal detection unit 131 and an output control unit 132; the signal detection unit 131 connects to an on/standby signal input terminal STB and an output control unit 132, the output control unit 132 further connects to the power supply module 14. When the signal detection unit 131 detects a power-on signal, a first level will be output to the output control unit 132, and when detecting a standby signal, a second level will be output to the control unit 132. When receiving the first level, the output control unit 132 controls the power supply module 14 turn on the resonance control module 12 and the PFC circuit 3 successively; when receiving the second level, the output control unit 132 controls the power supply module 14 shut off the PFC circuit 3. In the present embodiment, by the signal detection unit 131 receiving the power-on signal and the standby signal, further by the output control unit 132 controlling the power supply module 14 realize a plurality of power supply operations accordingly, making the auxiliary power supply 10 be able to act as a standby power supply at a same time of satisfying a power supply requirement for the mainboard, thus eliminating a separate standby circuit, which has effectively simplified a power supply architecture and saved a system cost thereof.

Embodiment 3

In an implementation, shown as FIG. 2, the pre-start unit 121 comprises a first diode D1 and a first resistor, the resonance control unit 122 comprises a first resonance controller U1; an anode of the first diode D1 connects to an output terminal of the EMI filter circuit 1, a cathode of the first diode D1 connects to an HV signal terminal of the first resonance controller U1 through the first resistor; an HO signal terminal, an LO signal terminal, and an HB signal terminal of the first resonance controller U1 connect to the first LLC resonance module 11, an FB signal terminal of the first resonance controller U1 connects to the feedback unit 123, a VCC terminal of the first resonance controller U1 connects to the power supply module 14; the feedback unit 123 further connects to an output terminal of the rectifying filter module 15. After powered on, the input AC is filtered by the EMI filter circuit 1 and rectified by the first diode D1, before being output to an HV signal terminal of the first resonance controller U1. Through such a high pre-start voltage, a start of the first resonance controller U1 is achieved, followed by outputting a DC low-voltage VCC for power supply through the power supply module 14 when receiving a power-on signal. It is not necessary to keep a high-voltage power supply, reducing power consumption as much as possible. The first resonance controller U1, after starting to work, outputs an upper transistor drive signal HO and a lower transistor drive signal LO to drive the first LLC resonance module 11 to work, to make a voltage transform and output an energy at a secondary part. In the present embodiment, the first resonance controller U1 may adopt a control chip with a model of FA6A31N. Of course, in a plurality of other embodiments, a plurality of other resonance controllers having a same function may also be adopted, thus no limitations will be given in the present disclosure.

Further, the signal detection unit 131 comprises a second resistor R2, a third resistor R3, a first capacitor C1, and a triode Q1; the output control unit 132 comprises an optocoupler U2, one end of the second resistor R2 connects to an on/standby signal input terminal, another end of the second resistor R2 connects to one end of the third resistor R3, one end of the first capacitor C1, and a base of the triode Q1; while another end of the third resistor R3, another end of the first capacitor C1, and an emitter of the triode Q1 are all grounded; a collector of the triode Q1 connects to a second terminal of the optocoupler U2; a first terminal of the optocoupler U2 connects to a second voltage output terminal; a third terminal and a fourth terminal of the optocoupler U2 are both connected to the power supply module 14.

The first LLC resonance module 11 comprises a fourth resistor R4, a fifth resistor R5, a first MOS transistor M1, a second MOS transistor M2, a second capacitor C2, a third capacitor C3, a second diode D2, and a first transformer T1, the rectifying filter module 15 comprises a first rectifying filter unit 151 and a second rectifying filter unit 152; one end of the fourth resistor R4 connects to the HO signal terminal of the first resonance controller U1, another end of the fourth resistor R4 connects to a gate of the first MOS transistor M1; one end of the fifth resistor R5 connects to the LO signal terminal of the first resonance controller U1, another end of the fifth resistor R5 connects to a gate of the second MOS transistor M2; a drain of the first MOS transistor M1 connects to an output terminal of the PFC circuit 3, a source of the first MOS transistor M1 connects to a drain of the second MOS transistor M2, an HB signal terminal of the first resonance controller U1 and a first terminal of the first transformer T1; a source of the second MOS transistor M2 gets grounded; one end of the second capacitor C2 connects to a second terminal of the first transformer T1, another end of the second capacitor C2 gets grounded; an anode of the second diode D2 connects to a third terminal of the first transformer T1, a cathode of the second diode D2 connects to an anode of the third capacitor C3 and the power supply module 14; a tenth terminal and a twelfth terminal of the first transformer T1 connect to a first voltage output terminal through the first rectifying filter unit 151, a sixth terminal and a ninth terminal of the first transformer T1 connect to the second voltage output terminal through the second rectifying filter unit 152. Both the first rectifying filter unit 151 and the second rectifying filter unit 152 are an existing mature circuit, including a rectifying filter circuit composed by a diode and a capacitor.

In the present embodiment, when powering on, the power supply module 14 controls a VCC power supply of the PFC circuit 3 and a VCC power supply sequence of the first resonance controller U1. The power supply module 14 may adopt an existing power supply, including a dual-line DC stabilized power supply, providing a power supply voltage to the PFC circuit 3 and the first resonance controller U1 successively through the power supply module 14. Specifically, since an input voltage is 100-240V, thus at a moment of powering on, a secondary output is in a light load state, the first resonance controller U1 gets powered on first, then generates a steady VC voltage after being rectified by an auxiliary winding N2 of the first transformer T1 and the second diode D2, before supplying the first resonance controller U1 for power through the power supply module 14. When the on/standby signal input terminal STB receives a power-on signal (a high level in the present embodiment), through the second resistor R2, the third resistor R3, the first capacitor C1, and the transistor Q1, a high level is output, and an optocoupler U2 is controlled on, thus the power supply module 14 is controlled to output a PFCVCC voltage to power the PFC circuit 3. After a module of the PFC circuit 3 works normally, an PFC voltage is output, and after the PFC voltage is steadily established, the auxiliary power supply 10 enters a normal working mode. The first resonance controller U1 outputs an upper transistor driving signal HO and a lower transistor driving signal LO respectively, to control an upper transistor which is the first MOS transistor M1 and a lower transistor which is the second MOS transistor M2 in the first LLC resonance module 11 be turned on and off, composing a resonance conversion network with the first transformer T1 and a resonance capacitor which is the second capacitor C2, before outputting energy to the secondary part after a voltage transform is performed by the first transformer T1, and outputting two voltages of Vout2 and +12V after being rectified and filtered by the first rectifying filter unit 151 and the second rectifying filter unit 152 respectively, wherein the +12V is output to the secondary LLC resonance module for a power supply, after the secondary LLC resonance module works normally, the main power supply 20 starts to work normally, and the second LLC resonance module 21 converts the PFC voltage before outputting a Vout1 to the backlight module for power, and now a power supply system in a whole enters a normal working state.

In the present disclosure, the auxiliary power supply 10 adopts an LLC circuit, a primary MOS zero voltage switch (ZVS) and a secondary rectifier diode zero current switch (ZCS), that has greatly lowered an EMI risk for the auxiliary power supply 10. Further preferably, in order to improve a work stability of the power supply system, the auxiliary power supply has further a third diode D3, a twelfth resistor R12, and a thirteenth resistor R13 arranged, an anode of the third diode D3 connects to the EMI filter circuit 1, a cathode of the third diode D3 connects to a BO signal terminal of the first resonance controller U1 and one terminal of the thirteenth resistor R13 through the twelfth resistor R12, another terminal of the thirteenth resistor R13 gets grounded. When an input voltage is lower than a voltage protection value preset, by detecting an input signal pin of the BO signal terminal, the first resonance controller U1 stops working, and the auxiliary power supply 10 stops working in a whole, before making a whole power system stop working. Thus a role of voltage protection is achieved, and a stability of the power system is improved.

Figure 3:
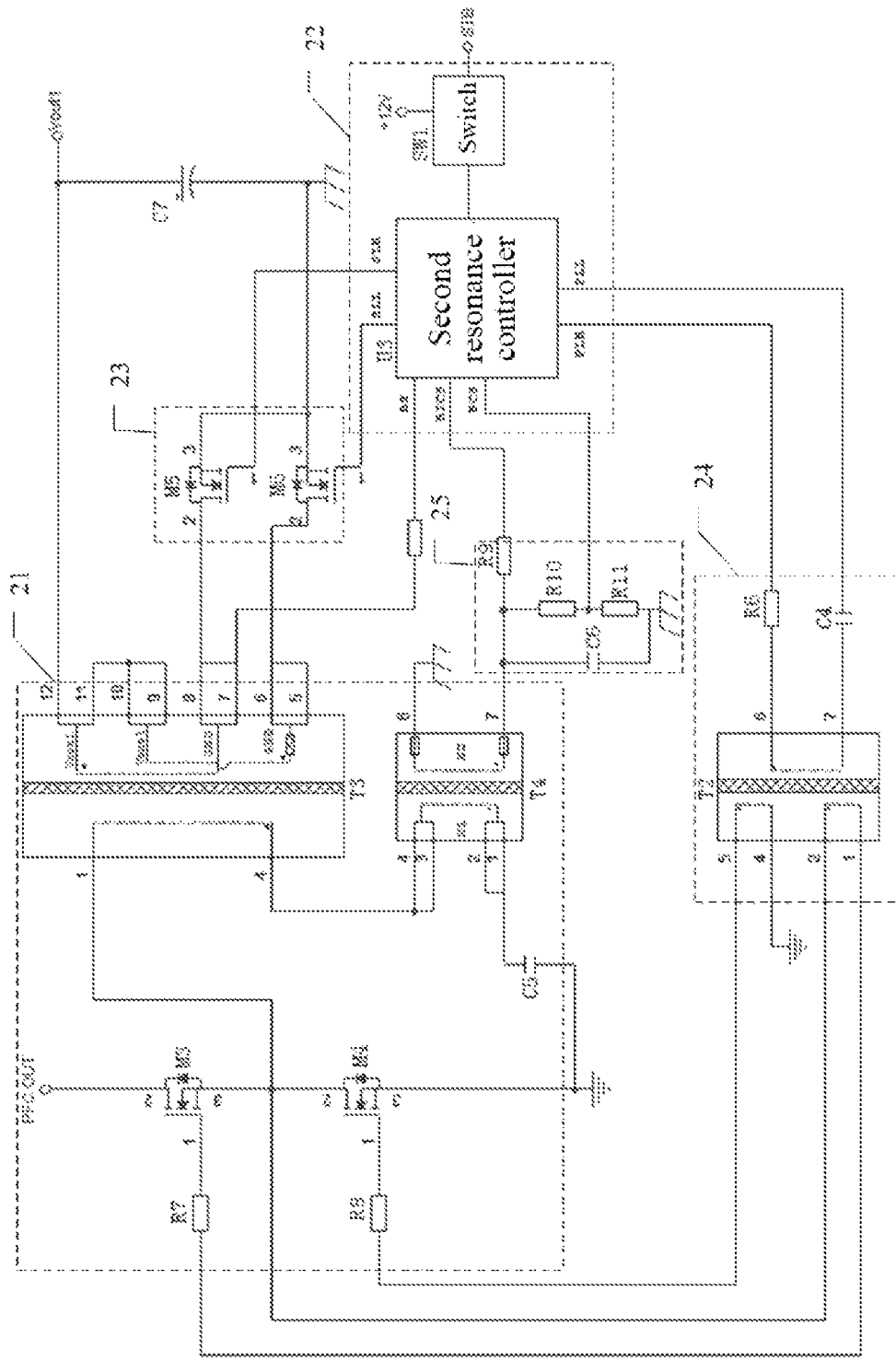
FIG. 3 illustrates a circuit diagram of a main power supply in a television power driving device provided by the present disclosure.

Further, referencing to FIG. 3 together, the secondary LLC control module 22 comprises a second resonance controller U3 and a switch SW1, the driving isolation module 24 comprises a driving transformer T2, a sixth resistor R6, and a fourth capacitor C4; one end of the sixth resistor R6 connects to a PLH signal terminal of the second resonance controller U3, another end of the sixth resistor R6 connects to a sixth terminal of the driving transformer T2; one end of the fourth capacitor C4 connects to a PLL signal terminal of the second resonance controller U3, another end of the fourth capacitor C4 connects to a seventh terminal of the driving transformer T2; a first terminal, a second terminal, and a fifth terminal of the driving transformer T2 are all connected to the second LLC resonance module 21; a power terminal of the second resonance controller U3 connects to the on/standby signal input terminal STB and a second voltage output terminal through the switch SW1, a BCS signal terminal and a BICS signal terminal of the second resonance controller U3 are both connected to the current detection module, an SLH signal terminal and an SLL signal terminal of the second resonance controller are both connected to the synchronous rectifier module 23.

The second LLC resonance module 21 comprises a seventh resistor R7, an eighth resistor R8, a third MOS transistor M3, a fourth MOS transistor M4, a fifth capacitor C5, a second transformer T3, and a current transformer T4; the current detection module 25 comprises a ninth resistor R9, a tenth resistor R10, an eleventh resistor R11, and a sixth capacitor C6; the synchronous rectifier module 23 comprises a fifth MOS transistor M5 and a sixth MOS transistor M6, the main power supply 20 further comprises a seventh capacitor C7 for filtering; one end of the seventh resistor R7 connects to the first terminal of the driving transformer T2, another end of the seventh resistor R7 connects to a gate of the third MOS transistor M3; one end of the eighth resistor R8 connects to the fifth terminal of the driving transformer T2, another end of the eighth resistor R8 connects to a gate of the fourth MOS transistor M4; a drain of the third MOS transistor M3 connects to an output terminal of the PFC circuit 3; a source of the third MOS transistor M3 connects to a drain of the fourth MOS transistor M4, the second terminal of the driving transformer T2, and a first terminal of the second transformer T3; a source of the fourth MOS transistor M4 gets grounded; a fourth terminal of the second transformer T3 connects to a third terminal and a fourth terminal of the current transformer T4, a fifth terminal and a sixth terminal of the second transformer T3 are connected to a drain of the sixth MOS transistor M6; a seventh terminal and an eighth terminal of the second transformer T3 are connected to a drain of the fifth MOS transistor M5; a ninth terminal, a tenth terminal, an eleventh terminal, and a twelfth terminal of the second transformer T3 are all connected to an anode of the seventh capacitor C7 and a third voltage output terminal; a gate of the fifth MOS transistor M5 connects to the SLH signal terminal of the second resonance controller U3, a gate of the sixth MOS transistor M6 connects to the SLL signal terminal of the second resonance controller U3, a source of the fifth MOS transistor M5, a source of the sixth MOS transistor M6 and a cathode of the seventh capacitor C7 are all grounded; one end of the fifth capacitor C5 connects to a first terminal and a second terminal of the current transformer T4, another end of the fifth capacitor C5 gets grounded; a seventh terminal of the current transformer T4 connects to one end of the ninth resistor R9, one end of the tenth resistor R10 and one end of the sixth capacitor C6; another end of the ninth resistor R9 connects to the BICS signal terminal of the second resonance controller U3; another end of the tenth resistor R10 connects to the BSC signal terminal of the second resonance controller U3 and one end of the eleventh resistor R11; another end of the sixth capacitor C6 and another end of the eleventh resistor R11 are grounded.

In the present embodiment, when powering on, after a power-on signal is input into the on/standby signal input terminal STB, the PFC circuit 3 is turned on to output the PFC voltage, and the first resonance controller U1 controls the first LLC resonance module 11 to work normally, the PFC voltage is transformed by the first transformer T1 before outputting the second voltage +12V, which passes the switch SW1 controlled by the STB signal and powers the second resonance controller U3, that is, when receiving the power-on signal, the switch SW1 controls a conduction between the second voltage output terminal and a power supply terminal of the second resonance controller U3, making the first transformer T1 output +12V to power supply the second resonance controller U3 to start to work, after the second resonance controller U3 gets started and worked normally, the upper transistor drive signal PLH and the lower transistor drive signal PLL are output respectively, the driving transformer T2 controls an on/off of the upper transistor in the second LLC resonance module 21 of the third MOS transistor M3 and the lower transistor of the fourth MOS transistor M4 respectively, composing a resonance conversion network with the second transformer T3, the current transformer T4 and the fifth capacitor C5. After the second transformer T3 outputting energy to the secondary part, a voltage output from the secondary part was synchronously rectified by a plurality of synchronous rectifier MOS transistors of the fifth MOS transistor M5 and the sixth MOS transistor M6, before a third voltage Vout1 is output to power the backlight module, and light up the screen, making a whole power system enter a normal work mode. Wherein the current transformer T4 is applied to detecting a current in a resonance circuit, after passing a detection circuit of the sixth capacitor C6 and the ninth resistor R9, an overcurrent protection voltage sampling circuit of the tenth resistor R10 and the eleventh resistor R11, a current feedback signal is output to the second resonance controller U3, achieving a control and a protection to an output power of an LLC resonance loop. At a same time, the second resonance controller U3 further realizes an output after rectification from the secondary part, by controlling the on/off of the synchronous rectifier MOS transistors of the fifth MOS transistor M5 and the sixth MOS transistor M6. In the present application, a high-power LLC control is set on a secondary output, and an LLC MOS transistor in the main power supply 20 is driven in an isolation way by the driving transformer T2, which has reduced a risk of a control chip being damaged at a primary level. At a same time, the main power supply 20 adopts a method of sharing a synchronous rectification and LLC in one chip for output, that is, the second resonance controller U3 adopts a method of combining together an LLC driving and a secondary output synchronous rectification, that has improved a reliability of a synchronous rectification scheme, wherein the second resonance controller U3 may adopt a control chip with a model of FAN7688SJX. Of course, in a plurality of other embodiments, other resonance controllers having a same function may also be adopted, which is not limited in the present disclosure.

When a standby signal (which is a low level in the present embodiment) is input into the on/standby signal input terminal STB, the standby signal outputs a low level to control the optocoupler U2 turn off, after passing the second resistor R2, the third resistor R3, the first capacitor C1C1 and the triode Q1, making the power supply module 14 stop supplying power to the PFC circuit 3, the PFC circuit 3 is turned off, the first LLC resonance module 11 stops outputting the second voltage to the secondary LLC control module 22, and the standby signal further cuts off a circuit between the second voltage output terminal and the second resonance controller U3 by the switch SW1 in the secondary LLC control module 22, making the second resonance controller U3 stop working, the second transformer T3 stop outputting the third voltage to the backlight module, the screen turn off, now the power supply module 14 supplies power to the first resonance controller U1 only, making it enter a standby mode, at this point, the power system in a whole enters the standby mode, and until a start signal is received, the PFC circuit 3 is turned on again, before the system in a whole enters a power-on state again and lights up the screen. Therefore, in the present disclosure, a separate standby circuit may be omitted, and a low standby power consumption may be achieved. The auxiliary power supply 10 may be used as a power source for a mainboard or a standby power source, which has also simplified an architecture of the high-power power supply, saving a system cost.

Embodiment 4

Based on the television power driving device described above, the present disclosure further provides a television, comprising the television power driving device described above. Since the television power driving device has been described in details above, no more descriptions will be stated herein.

All above, the television power driving device and the television provided by the present disclosure, wherein the television power driving device comprises a power board connected to a mainboard and a backlight module. The power board has a PFC circuit arranged, and the power board has further an auxiliary power supply for powering the mainboard, and a main power supply for powering the backlight module; the auxiliary power supply comprises a first LLC resonance module, a resonance control module, a standby control module, a power supply module, and a rectifying filter module; the main power supply comprises a second LLC resonance module, a secondary LLC control module and a synchronous rectifier module. After powered on, the standby control module controls the power supply module to turn on the resonance control module and the PFC circuit successively when receiving a power-on signal, and the PFC circuit outputs a PFC voltage to the first LLC resonance module and the second LLC resonance module, the first LLC resonance module converts the PFC voltage into a first voltage and a second voltage according to a first control signal output from the resonance control module, before outputting respectively to the mainboard and the secondary LLC control module for power, after being rectified and filtered by the rectifying filter module. The second LLC resonance module converts the PFC voltage to a third voltage according to a second control signal output by the secondary LLC control module, and outputs to the backlight module for power after the synchronous rectifier module performing a synchronous rectification; the standby control module controls the power supply module to shut down the PFC circuit to stop outputting the PFC voltage, when receiving the standby signal, making the resonance control module enter a standby state. By both the main power supply and the auxiliary power supply adopting an LLC architecture and eliminating a separate standby circuit, it is achieved that the power supply architecture is simplified, while avoiding a problem of limiting a power efficiency and a heat dissipation.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

INDUSTRIAL IMPLEMENTATION

The embodiments of the present disclosure provide a television power supply driving device and a television. By both the main power supply and the auxiliary power supply adopting an LLC architecture and eliminating a separate standby circuit, it is achieved that the power supply architecture is simplified, while avoiding a problem of limiting a power efficiency and a heat dissipation.

What is claimed is:

1. A television power supply driving device, comprising a power board connected to a mainboard and a backlight module, the power board has a PFC circuit arranged, wherein the power board has further arranged an auxiliary power supply for supplying power to the mainboard, and a main power supply for supplying the backlight module; the auxiliary power supply comprises a first LLC resonance module, a resonance control module, a standby control module, a power supply module, and a rectifying filter module; the main power supply comprises a second LLC resonance module, a secondary LLC control module, and a synchronous rectifier module;

after powered on, when receiving a power-on signal, the standby control module controls the power supply module to turn on the resonance control module and the PFC circuit successively, the PFC circuit outputs a PFC voltage to the first LLC resonance module and the second LLC resonance module, the first LLC resonance module converts the PFC voltage into a first voltage and a second voltage according to a first control signal output from the resonance control module, the first voltage and the second voltage are then output to the mainboard and the secondary LLC control module for power respectively, after being rectified and filtered by the rectifying filter module; the second LLC resonance module converts the PFC voltage into a third voltage according to a second control signal output by the secondary LLC control module, and the third voltage is output to the backlight module for power after being synchronous rectified by the synchronous rectifier module; the standby control module controls the power supply module to shut down the PFC circuit to stop outputting the PFC voltage, when receiving a standby signal, making the resonance control module enter a standby state.

2. The television power supply driving device according to claim 1, wherein the main power supply further comprises a driving isolation module, the driving isolation module isolates and outputs the second control signal output from the secondary LLC control module to the second LLC resonance module.

3. The television power supply driving device according to claim 2, wherein the main power supply further comprises a current detection module, the current detection module detects a current of the second LLC resonance module before outputting a current feedback signal to the secondary LLC control module, the secondary LLC control module adjusts the second control signal according to the current feedback signal.

4. The television power supply driving device according to claim 1, wherein the resonance control module comprises a pre-start unit, a resonance control unit, and a feedback unit; after powered on, the pre-start unit provides a pre-start voltage to the resonance control unit, and after being turned on, the resonance control unit outputs the first control signal to the first LLC resonance module; the feedback unit performs a voltage detection on the first voltage and the second voltage, and outputs a voltage feedback signal to the resonance control unit, the resonance control unit adjusts the first control signal based on the voltage feedback signal.

5. The television power supply driving device according to claim 1, wherein the standby control module comprises a signal detection unit and an output control unit; the signal detection unit outputs a first level to the output control unit when the power-on signal is detected, and outputs a second level to the output control unit when the standby signal is detected; the output control unit controls the power supply module to turn on the resonance control module and the PFC circuit successively when receiving the first level, and controls the power supply module to turn off the PFC circuit when receiving the second level.

6. The television power supply driving device according to claim 4, wherein the pre-start unit comprises a first diode and a first resistor, the resonance control unit comprises a first resonance controller; an anode of the first diode connects to an output terminal of an EMI filter circuit, a cathode of the first diode connects to an HV signal terminal of the first resonance controller through the first resistor; an HO signal terminal, an LO signal terminal, and an HB signal terminal of the first resonance controller connect to the first LLC resonance module, an FB signal terminal of the first resonance controller connects to the feedback unit, a VCC terminal of the first resonance controller connects to the power supply module; the feedback unit further connects to an output terminal of the rectifying filter module.

7. The television power supply driving device according to claim 5, wherein the signal detection unit comprises a second resistor, a third resistor, a first capacitor, and a triode; the output control unit comprises an optocoupler, one end of the second resistor connects to an on/standby signal input terminal, another end of the second resistor connects to one end of the third resistor, one end of the first capacitor, and a base of the triode; another end of the third resistor, another end of the first capacitor, and an emitter of the triode are all grounded; a collector of the triode connects to a second terminal of the optocoupler; a first terminal of the optocoupler connects to a second voltage output terminal; a third terminal and a fourth terminal of the optocoupler are both connected to the power supply module.

8. The television power supply driving device according to claim 6, wherein the first LLC resonance module comprises a fourth resistor, a fifth resistor, a first MOS transistor, a second MOS transistor, a second capacitor, a third capacitor, a second diode, and a first transformer, the rectifying filter module comprises a first rectifying filter unit and a second rectifying filter unit; one end of the fourth resistor connects to the HO signal terminal of the first resonance controller, another end of the fourth resistor connects to a gate of the first MOS transistor; one end of the fifth resistor connects to the LO signal terminal of the first resonance controller, another end of the fifth resistor connects to a gate of the second MOS transistor; a drain of the first MOS transistor connects to an output terminal of the PFC circuit, a source of the first MOS transistor connects to a drain of the second MOS transistor, the HB signal terminal of the first resonance controller and a first terminal of the first transformer; a source of the second MOS transistor gets grounded; one end of the second capacitor connects to a second terminal of the first transformer, another end of the second capacitor gets grounded; an anode of the second diode connects to a third terminal of the first transformer, a cathode of the second diode connects to an anode of the third capacitor and the power supply module; a tenth terminal and a twelfth terminal of the first transformer connect to a first voltage output terminal through the first rectifying filter unit, a sixth terminal and a ninth terminal of the first transformer connect to the second voltage output terminal through the second rectifying filter unit.

9. The television power supply driving device according to claim 3, wherein the secondary LLC control module comprises a second resonance controller and a switch, the driving isolation module comprises a driving transformer, a sixth resistor, and a fourth capacitor; one end of the sixth resistor connects to a PLH signal terminal of the second resonance controller, another end of the sixth resistor connects to a sixth terminal of the driving transformer; one end of the fourth capacitor connects to a PLL signal terminal of the second resonance controller, another end of the fourth capacitor connects to a seventh terminal of the driving transformer; a first terminal, a second terminal, and a fifth terminal of the driving transformer are all connected to the second LLC resonance module; a power terminal of the second resonance controller connects to the on/standby signal input terminal and a second voltage output terminal through the switch, a BCS signal terminal and a BICS signal terminal of the second resonance controller are both connected to the current detection module, an SLH signal terminal and an SLL signal terminal of the second resonance controller are both connected to the synchronous rectifier module.

10. The television power supply driving device according to claim 9, wherein the second LLC resonance module comprises a seventh resistor, an eighth resistor, a third MOS transistor, a fourth MOS transistor, a fifth capacitor, a second transformer, and a current transformer; one end of the seventh resistor connects to the first terminal of the driving transformer, another end of the seventh resistor connects to a gate of the third MOS transistor; one end of the eighth resistor connects to the fifth terminal of the driving transformer, another end of the eighth resistor connects to a gate of the fourth MOS transistor; a drain of the third MOS transistor connects to an output terminal of the PFC circuit;

a source of the third MOS transistor connects to a drain of the fourth MOS transistor, the second terminal of the driving transformer, and a first terminal of the second transformer; a source of the fourth MOS transistor gets grounded; a fourth terminal of the second transformer connects to a third terminal and a fourth terminal of the current transformer, a fifth terminal and a sixth terminal of the second transformer are connected to a drain of a sixth MOS transistor M6; a seventh terminal and an eighth terminal of the second transformer are connected to a drain of a fifth MOS transistor; a ninth terminal, a tenth terminal, an eleventh terminal, and a twelfth terminal of the second transformer are all connected to a third voltage output terminal; one end of the fifth capacitor connects to a first terminal and a second terminal of the current transformer, another end of the fifth capacitor gets grounded; a seventh terminal of the current transformer connects to the current detection module.

11. The television power supply driving device according to claim 10, wherein the current detection module comprises a ninth resistor, a tenth resistor, an eleventh resistor, and a sixth capacitor; one end of the ninth resistor and one end of the sixth capacitor are both connected to the seventh terminal of the current transformer and one end of the tenth resistor, another end of the ninth resistor connects to the BICS signal terminal of the second resonance controller; another end of the tenth resistor connects to the BSC signal terminal of the second resonance controller and one end of the eleventh resistor, another end of the sixth capacitor and another end of the eleventh resistor are both grounded.

12. The television power supply driving device according to claim 11, wherein the synchronous rectifier module comprises the fifth MOS transistor and the sixth MOS transistor, a gate of the fifth MOS transistor connects to the SLH signal terminal of the second resonance controller, the drain of the fifth MOS transistor connects to the seventh terminal and the eighth terminal of the second transformer, a gate of the sixth MOS transistor connects to the SLL signal terminal of the second resonance controller, the drain of the sixth MOS transistor connects to the fifth terminal and the sixth terminal of the second transformer, a source of the fifth MOS transistor and a source of the sixth MOS transistor are both grounded.

13. The television power supply driving device according to claim 12, wherein the main power supply further comprises a seventh capacitor, an anode of the seventh capacitor connects to the third voltage output terminal, the ninth terminal, the tenth terminal, the eleventh terminal, and the twelfth terminal of the second transformer, and a cathode of the seventh capacitor is grounded.

14. The television power supply driving device according to claim 6, wherein a model of the first resonance controller is FA6A31N.

15. A television, wherein comprising the television power supply driving device according to claim 1.

* * * * *